US 6,549,783 B1

(12) United States Patent
Touzeau et al.

(10) Patent No.: US 6,549,783 B1
(45) Date of Patent: *Apr. 15, 2003

(54) TELECOMMUNICATIONS SYSTEM, A CHANNEL EXTENSION PROTOCOL, AND A RADIO STATION

(75) Inventors: Patrick Touzeau, Le Mans (FR); Thierry P. F. Vaulay, Pruille-le-Chetif (FR); Gabriel C. M. Fernandez, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 08/976,645

(22) Filed: Nov. 24, 1997

(30) Foreign Application Priority Data

Nov. 29, 1996 (EP) .............................................. 96402586

(51) Int. Cl.[7] ................................................. H04Q 7/20
(52) U.S. Cl. ........................ 455/463; 455/464; 455/455; 455/450
(58) Field of Search ................................. 455/463, 464, 455/465, 462, 450, 452, 455, 422

(56) References Cited

U.S. PATENT DOCUMENTS

| 4,897,864 | A | * | 1/1990 | Murata et al. | 455/463 |
| 4,962,524 | A | | 10/1990 | Murata et al. | 379/61 |
| 5,136,629 | A | * | 8/1992 | Toyama et al. | 455/464 |
| 5,259,020 | A | * | 11/1993 | Hirano | 455/463 |
| 5,644,621 | A | * | 7/1997 | Yamashita et al. | 455/464 |
| 5,835,889 | A | * | 11/1998 | Kapanen | 704/215 |
| 5,920,620 | A | * | 7/1999 | Mori | 379/408 |

\* cited by examiner

Primary Examiner—Vivian Chin
Assistant Examiner—Eliseo Ramos-Feliciano
(74) Attorney, Agent, or Firm—Daniel J. Piotrowski (57) ABSTRACT

A point to multipoint channel extension protocol and system are disclosed. More particularly, the system includes an extension protocol for extending a point to point radio link between a primary station and a secondary station to a point to multipoint radio link in which the primary station broadcasts to the secondary stations. This is done by first informing the handset to which a point to point radio link has been set up that an extension is to be done so that the handset can switch off its transmitter, and then transmitting extension messages to all handsets. Furthermore, a transfer and skipping protocols are proposed with a reliable connection establishment by using a double checking protocol for seizing a pair of free channels.

7 Claims, 8 Drawing Sheets

TELECOMMUNICATIONS SYSTEM, A CHANNEL EXTENSION PROTOCOL, AND A RADIO STATION

BACKGROUND OF THE INVENTION

The present invention relates to a telecommunications system comprising at least one primary radio station and a plurality of secondary radio stations, in which at least one secondary radio station is matched to a primary radio station, wherein the stations have a transmitter and a receiver. Such a telecommunications system can be a cordless telecommunications system in which radio stations are matched to each other via an identification code, or any other suitable system in which matched radio stations communicate with each other.

A telecommunications system of the above kind is a known CT0 or CT1 telephone readily available onto the market. When intended for the European market, such phones operate with paired channels for a full duplex communication link, and when intended for the US market, such phones at least partly operate with unpaired channels. At call establishment, channels are scanned using a channel selection protocol. No busy channels may be applied to a new call. To this end the field strength of the received signal is measured and a channel is considered free if the field strength is below a given threshold. Cordless phones are sold comprising a base station coupled to the public switched telephone network and at least one portable station having an identification code matching the base station's identification code. When having a so-called multi-handset cordless phone, several additional functions can be implemented whereby the base station has information for all handsets. The base station could broadcast a ringing signal to all handsets, for instance.

OBJECTS AND SUMMARY OF THE INVENTION

It is an object of the present invention to provide a telecommunications system of the above, kind with an efficient and reliable point to multipoint radio protocol.

Accordingly to the present invention is characterised in that the primary station is arranged for setting up a point to point full duplex communication link to a matched secondary station or vice versa, and that the primary station is arranged for issuing an extension request to the matched secondary station and to further matched secondary stations after the setting up of the point to point communication link, and that the secondary station to which the communication link has been set up switches off its transmitter, and that the matched secondary station and the further matched secondary stations have their receivers ready for receiving a broadcast message from the primary station. The present invention is based upon the insight that by first establishing a reliable point to point duplex link to a handset or by starting from a reliable existing radio link, and then commanding the one handset to switch off its transmitter. By transmitting the extension message continuously, handsets not having received earlier extension messages can join the extension process. Such a situation could occur if an additional handset is switched on or comes out of a radio shadow.

In an embodiment of a telecommunications system according to the present invention, the primary station is arranged for issuing a release request to matched secondary stations receiving broadcast messages from the primary station after having received the extension request, the secondary stations releasing the communication link with the primary station after having received the release request. Herewith, the broadcast channel comes available again.

In a different embodiment of a telecommunications system according to the present invention the primary station is arranged for setting up a point to point full duplex communication link to a matched secondary station or vice versa, that the secondary station to which the full duplex communication has been set up is arranged for transmitting a transfer message to the primary station for transferring the link to another matched secondary station. The primary station transmits a release request to the secondary station to which the link has been set up, and that the primary station issues a link establishment request for establishing a full duplex communication link with the other matched secondary station. Herewith, a set up link can reliably be transferred to another station.

In a still different embodiment of a telecommunications system according to the present invention, the primary station is arranged for setting up a point to point full duplex communication link to a matched secondary station or vice versa. The secondary station to which the full duplex communication has been set up is arranged for transmitting a channel skip message to the primary station for skipping the link to another channel. The primary station transmits a release request to the secondary station to which the link has been set up in response to which the secondary station enters a channel scanning mode that the primary station issues a link establishment skip request for establishing another full duplex communication link with the secondary station. The primary station then transmits a skip off message to the secondary station after having set up the other communication link. Herewith, reliable channel skipping is achieved.

In an embodiment of a telecommunications system according to the present invention, the station establishing the point to point communication link is arranged for issuing an establishment request for establishing the communication link with the opposite station while applying a double checking protocol for checking whether both channels in the duplex communication link are free, which double checking protocol comprises the following steps:

a) after having found a free channel, the establishing station switches on its transmitter and transmits at least one activation message to the opposite station,
  b) after having received and decoded an activation message, the opposite station switches on its transmitter on a free channel and checks for a first predetermined period of time whether the establishing station has switched off its transmitter within the first period for channel on which its transmits the at least one activation message,
  c) the establishing station switches off its transmitter if a busy channel of the opposite station is found,
  d) if the channel is free, the opposite station transmits at least one acknowledgement message on the channel it has selected after having received the activation message, and
  e) the establishing station switches on its transmitter on the channel it was transmitting the at least one activation message after having received and decoded the acknowledgement message. Herewith, full duplex link establishments can be done very reliable, both for systems with unpaired and for systems with paired duplex channels. Because such point to point link establishment is also used in the multi-handset broadcast protocol, this protocol is also very reliable. The double checking protocol itself is claimed and described in a patent application (copending application Ser. No. 08/976,647) filed by the same applicant on the same day.

BRIEF DESCRIPTION OF THE DRAWINGS

The present invention will now be described, by way of example, with reference to the accompanying drawings, wherein FIG. 1 schematically shows a cordless telecommunications system according to the present invention.

Throughout the figures the same reference numerals are used for the same features.

DETAILED DESCRIPTION OF THE PREFERRED EMBODIMENT

Figure 1:
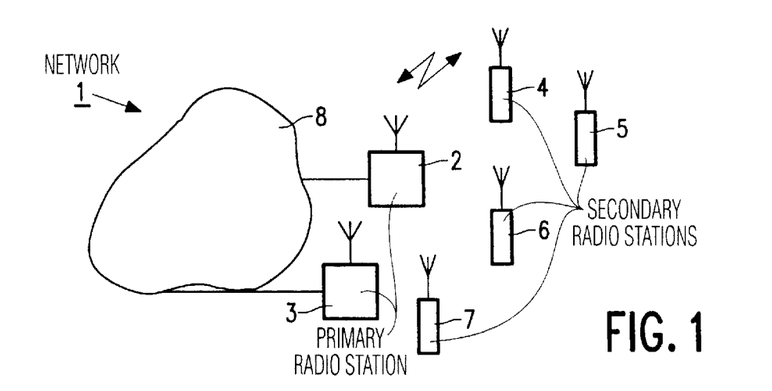

FIG. 1 schematically shows a shows a cordless telecommunications system 1 comprising primary radio stations 2 and 3, and secondary radio stations 4, 5, 6 and 7. The radio stations 2, 4, 5 and 6 are matched to each other in that they all have the same identification code. These stations form a so-called multi-handset cordless telephone according to the CT0 Standard or the CT1 Standard, for instance. Stations 3 and 7 are also matched to each other. The secondary stations 2 and 3 are coupled to the public switched telephone network 8. The shown devices are suitable for at least telephony speech traffic.

Figure 2:
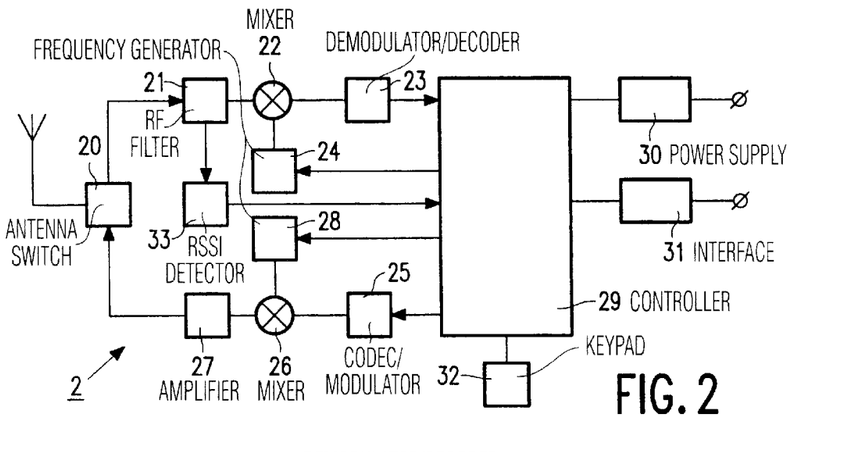
FIG. 2 shows a block diagram of the primary station according to the present invention.

FIG. 2 shows a block diagram of the primary station 2 according to the present invention. Station 2 comprises a reception path and a transmission path coupled to an antenna switch 20. The reception path comprises a cascade of a tuneable RF-filter 21, a mixer 22, a demodulator/decoder 23. The mixer 22 is further coupled to tuneable frequency generation means 24 so that the receiver can be tuned to a given channel. The transmission path comprises a cascade of the coder/modulator 25, a mixer 26, and a power amplifier 27. The mixer 26 is further coupled to tuneable frequency generating means 28. A micro controller 29 having a programmed ROM (Read Only Memory) and/or a programmed EEPROM (Electrically Alterable Programmable Read Only Memory) and a RAM (Random Access Memory) is provided for controlling the functionality of the primary station 2. The micro controller 29 is further coupled to a power supply 30 and to a line interface circuit 31 for coupling the primary station 2 to the public switched telephone network 8. Conventional functionality such as controlling the frequency generating means 24 and 28 so as to tune to a specific frequency channel and scanning an (optional) keypad 32, is not described in further detail here, such functioning being well-known in the art. The primary station 2 comprises an RSSI detector (Received Signal Strength Indicator) 33 coupled between the RF-filter 21 and the micro controller 29 for measuring the field strength of the received signal in the channel to which the primary station is tuned.

Figure 3:
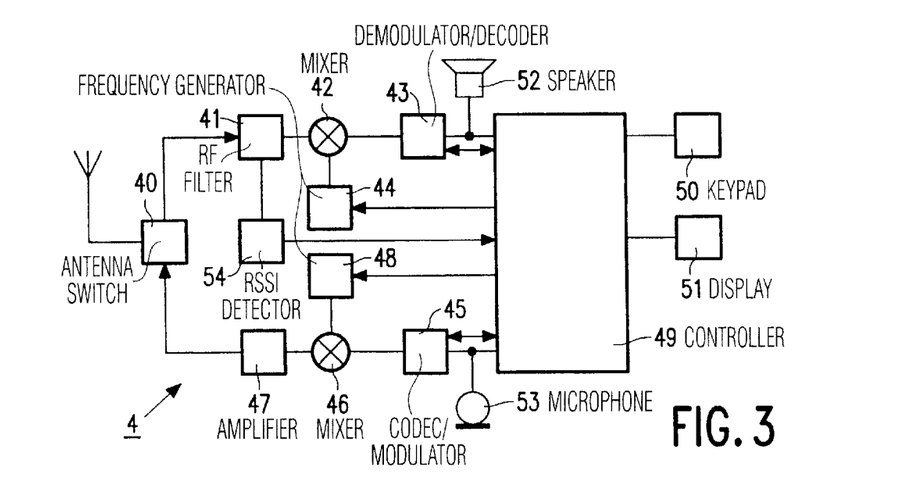
FIG. 3 shows a block diagram of the secondary station according to the present invention.

FIG. 3 shows a block diagram of the secondary station 4 according to the present invention. The station 4 comprises a reception path and a transmission path coupled to an antenna switch 40. The reception path comprises a cascade of a tuneable RF-filter 41, a mixer 42, a demodulator/decoder 43. The mixer 42 is further coupled to tuneable frequency generation means 44 so that the receiver can be tuned to a given channel. The transmission path comprises a cascade of the coder/modulator 45, a mixer 46, and a power amplifier 47. The mixer 46 is further coupled to tuneable frequency generating means 48. A micro controller 49 having a programmed ROM (Read Only Memory) and/or a programmed EEPROM (Electrically Alterable Programmable Read Only Memory) and a RAM (Random Access Memory) is provided for controlling the functionality of the secondary station 4. The micro controller 49 is further coupled to a keypad 50 and to a display 51. The demodulator/decoder 43 is coupled to a speaker 52 in the receive path and to the micro controller 49. The coder/modulator 45 is coupled to a microphone 53 in the transmit path. Conventional functionality such as controlling the frequency generating means 44 and 48 so as to tune to a specific frequency channel and scanning the keypad 50, is not described in further detail here, such functioning being well-known in the art. In the example given, voice signals are transmitted over the air interface as FM (Frequency Modulated) signals modulated on a carrier, and messages to be transmitted over the air interface are Manchester coded binary messages which can be evaluated by the micro controllers 29 and 49, after demodulation and decoding. Such Manchester coded messages and FM are well-known in the art. The programmed micro controllers 29 and 49 contain suitable parts of the programs for implementing the protocols according to the present invention. The secondary station 4 comprises an RSSI detector (Received Signal Strength Indicator) 54 coupled between the RF-filter 41 and the micro controller 49 for measuring the field strength of the received signal in the channel to which the secondary station is tuned.

Figure 4:
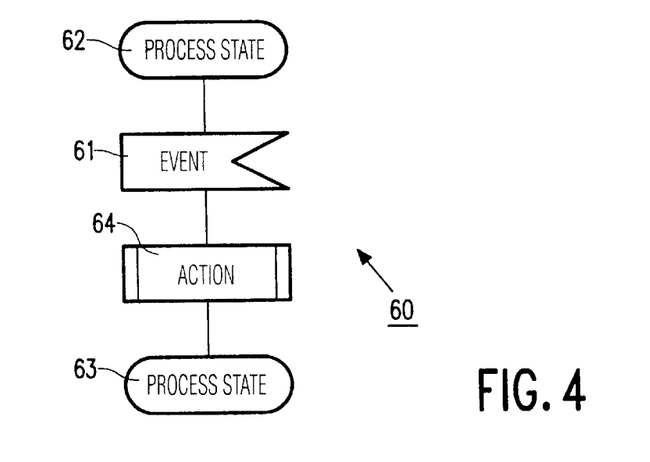
FIG. 4 shows a state diagram for illustrating the operation of the programs according to the present invention.

FIG. 4 shows a state diagram 60 for illustrating the operation of the programs according to the present invention. The programs are a set of real time software processes which are event driven, i.e., if a particular event occurs, such as an event 61, a transition occurs from a process state 62 to another process state 63 after an action 64 has been carried out. Events can also cause a jump to a state of another process. Such an organisation of software in the form of finite state machines is well-known in the art.

Figure 5:
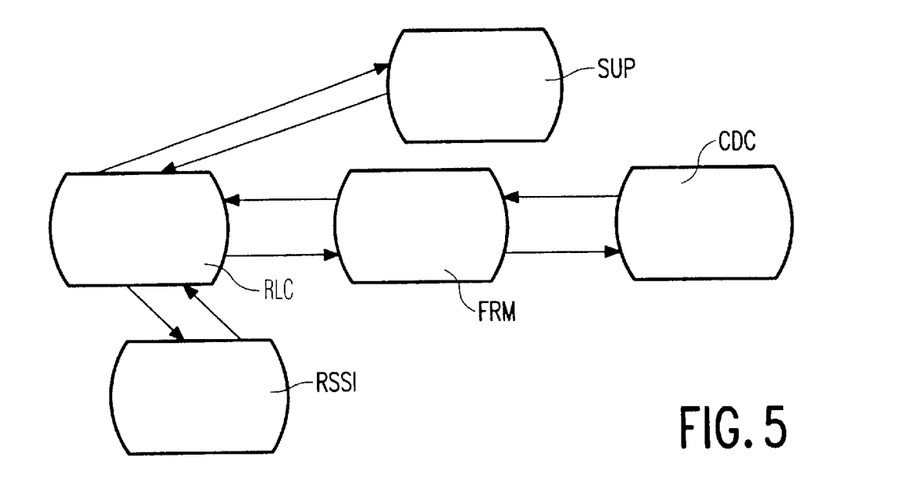
FIG. 5 shows processes to implement the protocols according to the present invention.

FIG. 5 shows the processes to implement the protocols according to the present invention. Processes can send events to another process. Shown are a layer-1 CODEC process CDC, a layer-2 FRAME process FRM, a layer-3 Radio Link Control process RLC, a higher layer Supervisor process SUP, and a layer-1+process RSSI. Arrows indicate software channels for exchanging events between processes. Such a layer structure of software and exchanging of events is well-known per se. Layer-1 is usually called the physical layer via which signals are conveyed from the primary station 2 to the secondary station 4, and vice versa. At layer-2 Frames of messages are built, at layer-3 radio link control is done, and at the higher layers higher level software is run at a supervisor level. In the sequel, the operation of the protocols according to the present invention will be described in terms of event driven software processes and the timing thereof.

Figure 6:
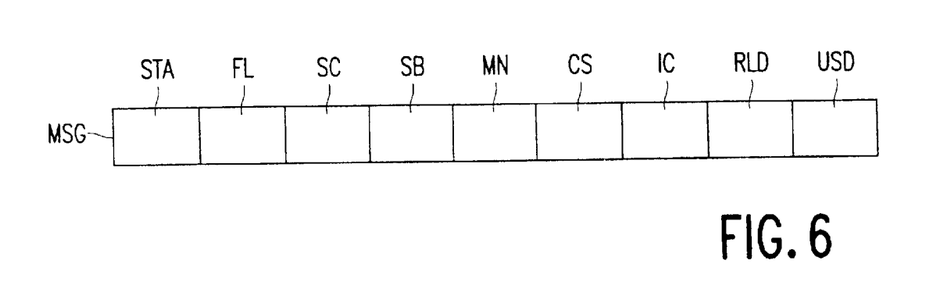
FIG. 6 shows a message format MSG for events.

FIG. 6 shows a message format MSG for the above events. The message MSG is a variable length message comprising the following message fields, a 16 bits Start field STA, a 5 bits Frame Length field FL, a 1 bit Scramble-bit field SC, a 2 bits Stream Bits field SB, an 8 bits Mobile Number field MN, an 8 bits Checksum field CS, a 16 bits Identification Code field IC, an 8 bits Radio Link Data field RLD, and an N*8 bits Application User Data field USD. The field STA contains a Manchester code word for synchronisation which is different for the primary station 2 and the secondary station 4 so as to avoid self-reception of frames. The two bits SB change with each transmission of the same message. Herewith, it is avoided that the same message (e.g. message content) is not seen as a new message and the software operates more efficiently. The Mobile Number MN is used with point to point radio links. Herewith, handsets in a multi-handset cordless phone can be distinguished. For distinguishing handsets belonging to a given base, the Identification Code is put in each frame. The user data contains information belonging to a particular radio link. The user data field USD is of variable length N, N being an integer value varying from 0 to a given positive value.

Figure 7:
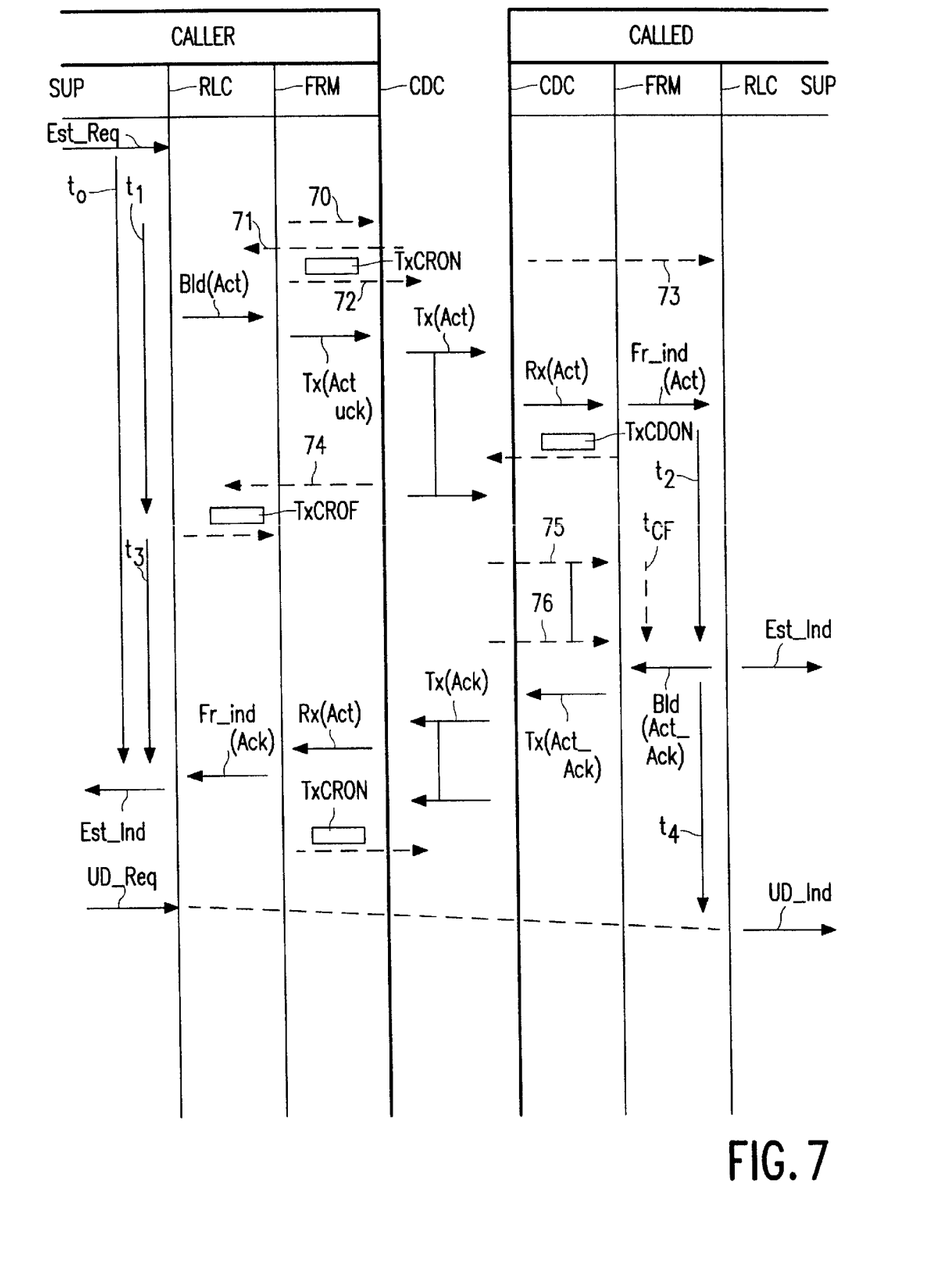
FIG. 7 shows a signalling diagram for a double checking protocol according to the present invention.

FIG. 7 shows a signalling diagram for the double checking protocol according to the present invention. Shown are a calling station CALLER and a called station CALLED. The CALLER and the CALLED can be a primary station and a secondary station, and vice versa. A point to point radio link is set up. Shown are events between the software processes as described as a function of time. Time evolves from the top of the diagram to the bottom of the diagram. At the level of the Supervisor SUP, so-called Primitives are generated initiating basic processes. In FIG. 7, the Primitive Est_Req is generated, initiating call establishment. The RSSI process is not indicated separately but is still present, this being indicated with dashed arrows. If a handset is the CALLER, this handset first carries out a complete channel scanning cycle so as to check whether the base station has not already initiated a call establishment protocol. In 70, the CALLER checks for a free channel by evaluating its RSSI signal, a free channel being indicated to the process RLC of the CALLER. Then, the CALLER switches on its transmitter, indicated with TxCRON so that the CALLED detects a busy channel occupied by the CALLER, indicated with 72 and 73. Thereafter, the CALLER's process RLC issues an event Bld(Act) to its process FRM for building up an Activation message Act. The activation message Act is assembled in a message format as described in FIG. 6, the message type being distinguished in the Radio Link Data Field RLD. The CALLER's process FRM issues an event Tx(Act, UCR) to its layer-1 Codec process CDC. Herewith, activation messages are sent to the Codec process of the CALLED via the air interface in an Unlimited Continuous Repetition mode UCR. This is indicated with connected arrows Tx(Act). The CALLED receives the activation message Rx(Act) and the CALLED's frame process FRM disassembles the received frame and informs its radio link control process RLC that it has received an activation message Act by issuing an event Fr_ind(Act). Then, the CALLED switches on its transmitter, indicated with TxCDON so that the CALLER's process RSSI detects a CALLER's busy channel, indicated with 74. It is essential that the CALLER now switches off its transmitter, indicated with TxCROF so that the CALLED sees a free channel. After the CALLER has switched off its transmitter, the CALLED should see the corresponding channel free for a period of time $t_{CF}$. This is because in the meantime another caller could have seized the free channel. In fact, the CALLED should see the channel free for the whole period $t_2$, from the instant it had switched on its transmitter until the end of the period $t_{CF}$, but because of the fact that the CALLER should first switch off its transmitter, the actual scanning period is $t_{CF}$. Channel free is indicated with the connected dashed arrows 75 and 76. After the CALLED is convinced to have found a free channel, its radio link process RLC informs its supervisor SUP, indicated with the event Est_Ind. Then, the CALLER builds an activation acknowledgement frame at an event Bld(Act_Ack) and transmits an activation acknowledge message to the CALLER at an event Tx(Act_Ack) via the air interface in a Limited Continuous Repetition mode LCR, i.e., the acknowledgement message is transmitted a given number of times, indicated with the connected arrows Tx(Ack). On reception of the acknowledgement message, the CALLER's process CDC issues an event Rx(Ack) to its frame disassembling process FRM, which process issues an event Fr_Ind(Ack) to its radio link control process RLC, which process issues an event Est_Ind to its supervisor SUP. Herewith, the point to point radio link is established and the CALLER switches on its transmitter, indicated with TxCRON. For confirmation of the established radio link, the CALLER transmits user data to the caller, initiating of transmission being indicated with the Primitive UD_Req and reception at supervisor level being indicated with UD_Req. The Primitive UD_Req will be described in FIG. 8. To prevent endless waiting by the CALLER or the CALLED, time outs are applied when waiting for a response of the other party. At supervisor level at the side of the CALLER, within a time out $t_0$ the supervisor should be informed that the link is established by receiving the event Est_Ind. Similarly, time outs $t_1$ and $t_3$ are defined for the CALLER's radio link control process RLC, and a time out $t_4$ for the CALLED's radio link process RLC. At an elapse of a time out, the entity adopts a channel scanning mode again.

Figure 8:
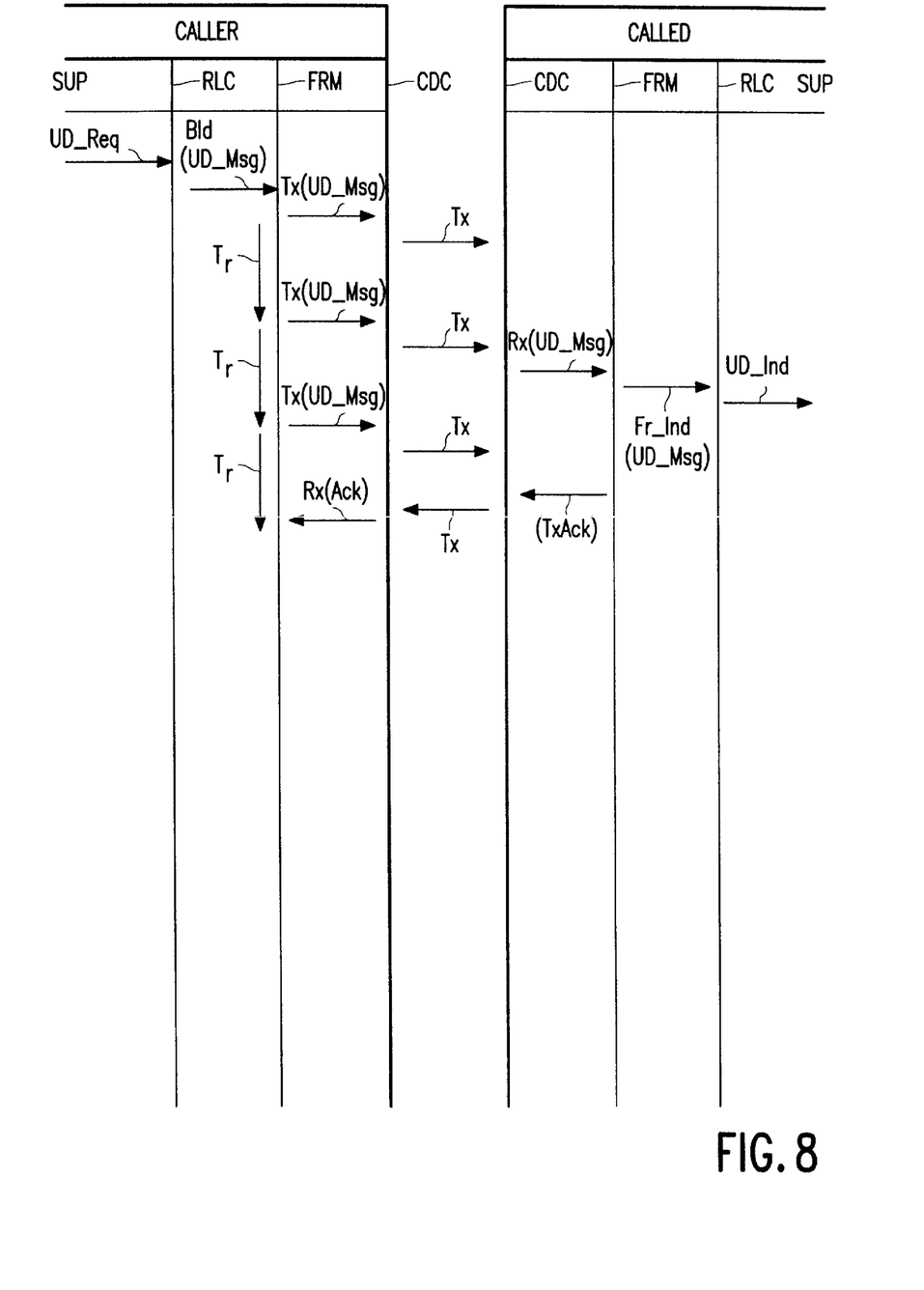
FIG. 8 shows a signalling diagram for transmission of user data in a double checking protocol according to the present invention.

FIG. 8 shows a signalling diagram for transmission of user data in a double checking protocol according to the present invention. User defined messages are transmitted via an already established radio link. The CALLER's supervisor issues an event UD_Req to its radio link process RLC, which process issues a frame building event Bld(UD_Msg) to its frame process FRM, which process issues a transmit user defined message to its codec CDC. The contents of the user defined message UD_Msg depends on the application thereof. In the given example, the user defined message is used for radio link confirmation. The user defined message is transmitted a number of times, in the given example three times, at regular intervals $T_r$. If after the third transmission no acknowledgement is received, the CALLER will release the radio link before returning to idle mode. Reception of the user defined message is indicated by the events Rx(UD_Msg), Fr_Ind(UD_Msg), and UD_Ind. Transmission and reception of an acknowledgement message is indicated by the events Tx(Ack) and Rx(Ack).

Figure 9:
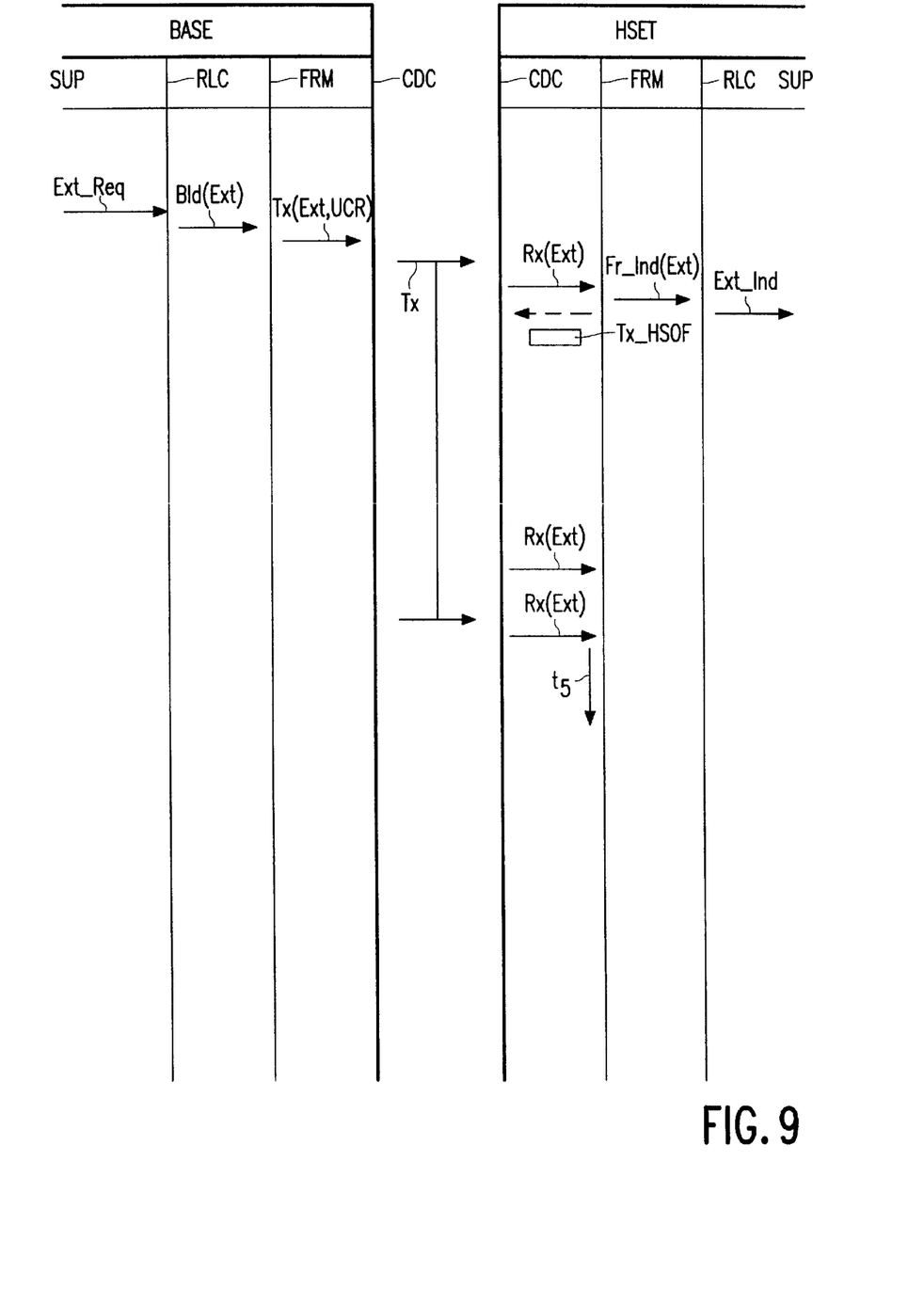
FIG. 9 shows a signalling diagram for extending a point to point link to a point to multipoint link according to the present invention.

FIG. 9 shows a signalling diagram for extending a point to point link to a point to multipoint link according to the present invention. Extending a radio link is done by a primary station such as a base station of a cordless telephone, indicated with BASE, to secondary stations such as handsets of the cordless telephone, indicated with HSETS. The handsets are matched to the base with their identification code. According to the present invention, extension is done to a point to point link, for example using the described supervisor Primitive Est_Req. For extending the radio link to more than one secondary station, the primary's station supervisor SUP generates a Primitive Ext_Req informing the BASE's radio link control process RLC to send an event Bld(Ext) to the process FRM for building up an extension frame. The BASE's frame process then issues an event Tx(Ext, UCR) to the codec CDC so as to initiate transmission of extension messages to its handsets HSETS in an Unlimited Continuous Repetition mode. After reception of the extension request the handset should assist in setting up a point to multipoint link so that the base can broadcast messages to several handsets. Upon reception of the extension message, the point to point handset generates the events Rx(Ext), Fr_Ind(Ext), and Ext_Ind so as to inform its supervisor SUP of the extension request. Thereafter, the point to point handset's transmitter is switched off, indicated with Tx_HSOF. Herewith, a point to multipoint radio link has been set up. For allowing handsets belonging to the same base to become involved in the point to multipoint radio link, the base continues to transmit extension messages, indicated with the connected arrows. If no point to point radio link existed before the base was to initiate an extension protocol, then a point to point radio link to one handset is set up. This is to find a reference handset first. A time out $t_5$ is defined. If after this time out has elapsed, the extended radio link is released automatically, both in the handsets and in the base.

Figure 10:
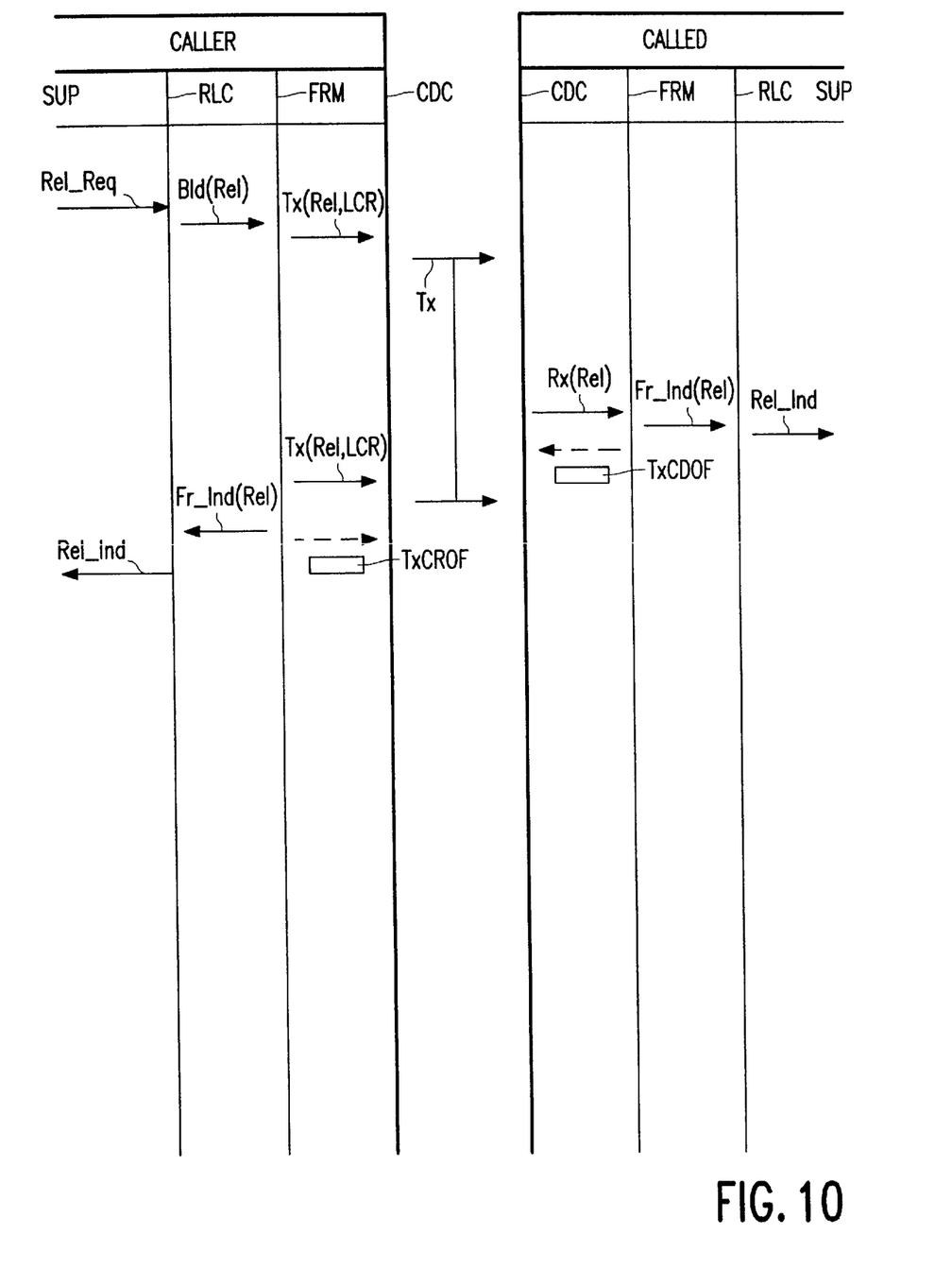
FIG. 10 shows a signalling diagram for releasing a radio link according to the present invention.

FIG. 10 shows a signalling diagram for releasing a radio link according to the present invention. For releasing a radio link, the CALLER generates the Primitive Rel_Req causing, via events Bld(Rel) and Tx(Rel, LCR), Limited Continuous Repetitive transmission of release messages to the CALLED. The CALLED generates events Rx(Rel), Fr_Ind(Rel) and Rel(Ind) upon reception of a release message so as to inform its supervisor of a release. Thereafter, only when in a point to point link, the CALLED switches off its transmitter, indicated with TxCDOF. After having sent its last release message, the CALLER switches off its transmitter, indicated with TxCROF and informs its supervisor SUP about having released the radio link, via events Fr_Ind(Rel) and Rel_Ind.

Figure 11:
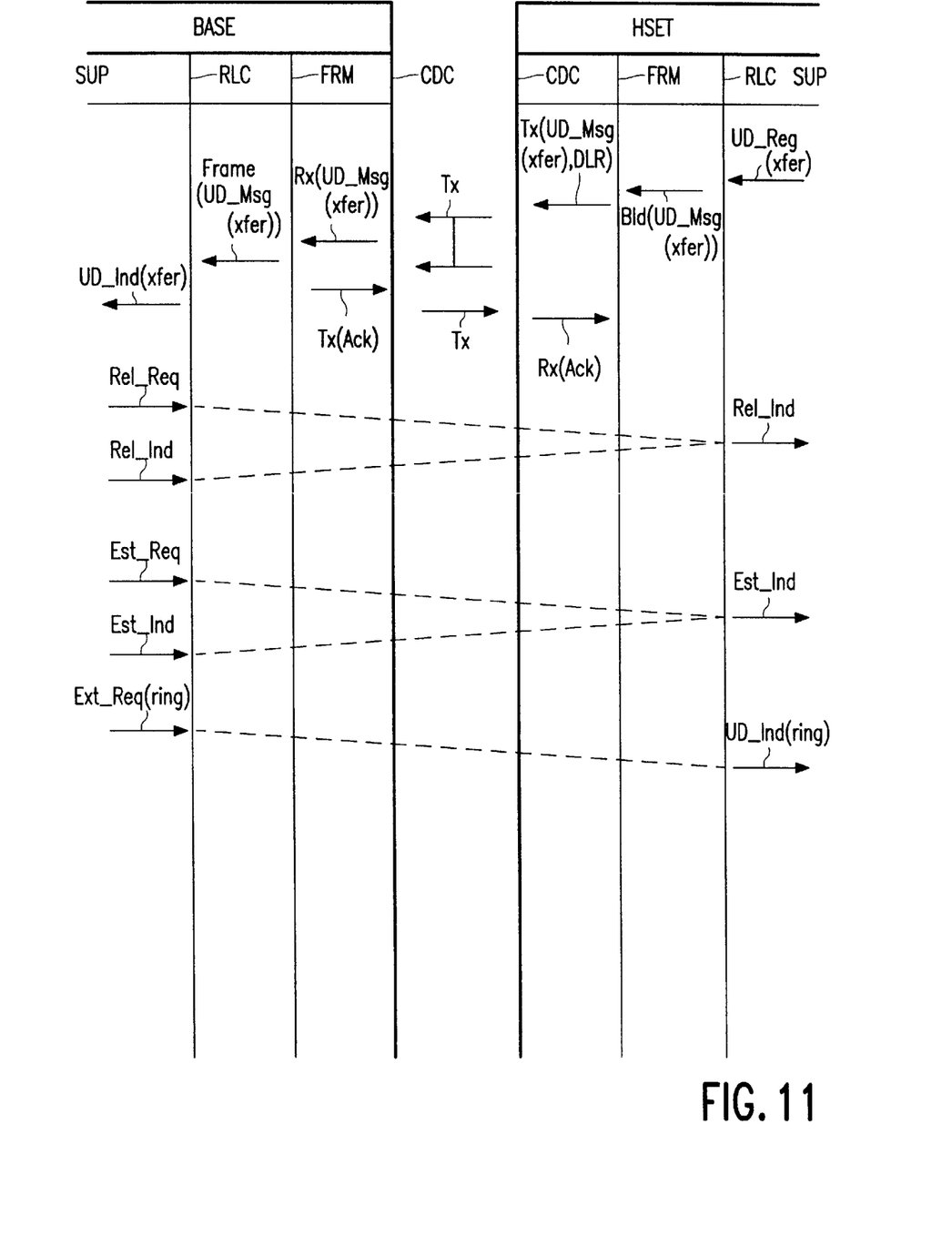
FIG. 11 shows a signalling diagram for transferring a radio link according to the present invention.

FIG. 11 shows a signalling diagram for transferring a radio link according to the present invention. Transferring is done from an already established point to point radio link. The handset HSET transmits a user message to the base BASE by sending a transfer message xfer to the BASE using the described Primitive UD_Req. Events UD_Req(xfer), Bld(UD_Req(xfer)), and Tx(UD_Msg(xfer)), DLR) are generates in the respective processes in the Handset HSET so as to initiate transmission of transfer messages to the base BASE. Upon reception of the transfer message xfer, the base BASE generates respective events Rx(UD_Msg(xfer)), Frame(UD_Msg(xfer)), and UD_Ind(xfer) so as to inform its supervisor SUP of the transfer request from the handset HSET. Thereupon, the base BASE first generates a release request Primitive Rel_Req, and then a point to point radio link establishment request primitive Est_Req. Thereafter, the base BASE generates a radio link extension Primitive so as to form a point to multipoint link in which it can broadcast a ringing signal to all handsets. The Primitives Rel_Req, Est_Req, Ext_Req, and UD_Req have been described in the foregoing and will not be described in detail here.

Figure 12:
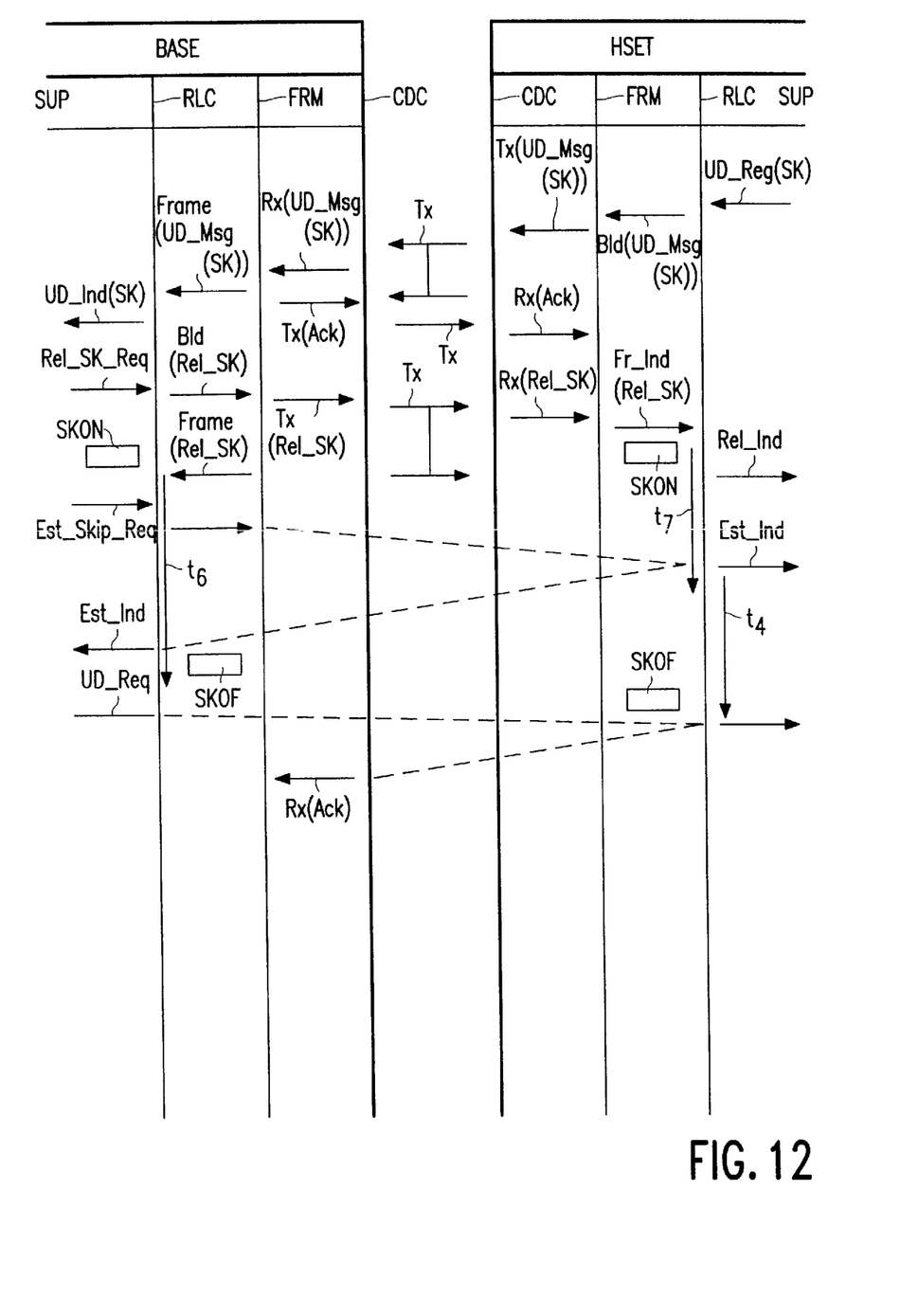
FIG. 12 shows a signalling diagram for skipping a radio link according to the present invention.

FIG. 12 shows a signalling diagram for skipping a radio link according to the present invention. A point to point radio link has been established before a channel skip request is generated by a handset. Similar to a transfer request, the handset HSET generates event UD_Req(sk) for requesting skipping to another channel, and events Bld(UD_Msg(sk)), and Tx(UD_Msg(sk)) so as to initiate transmission of channel skipping messages to the base BASE. Upon reception of the skipping message sk, the base BASE generates events Rx(UD_Msg(sk)), Frame(UD_MSg(sk)), and UD_ind(sk) so as to inform its supervisor SUP of the skipping request. The base BASE then transmits an acknowledgement message Tx(Ack) to the handset HSET receiving this message as Rx(Ack). Then, via events Rel_Sk_Req, Bld(Rel_sk), and Tx(Rel_sk) a release skip message is transmitted to the handset HSET. Upon reception of the release skip message, the handset HSET generates the events Rx(Rel_sk), Fr_Ind(Rel_sk), and Rel_Ind so as to inform its supervisor SUP of the release skip request. Thereupon, both the base BASE and the handset HSET set skipping mode on, indicated with SKON. Then, the handset and the base BASE generates a Primitive Est_Skip_Req similar to the Primitive Est_Req as described. The difference is that scanning is done on all radio channels and that the frame type is Activate_Skip instead of Activate as with the establishment of a normal point to point link. Upon reception of the event Est_Ind, the supervisor of the base BASE switches off skip mode, indicated with SKOF. The time out $t_4$ is applied so that the base BASE can confirm the channel skipping with a user defined essage UD_Req as was described in relation to the Est_Req Primitive. Furthermore, time outs $t_6$ and $t_7$ are defined for similar reasons as given before.

In view of the foregoing it will be evident to a person skilled in the art that various modifications may be made within the spirit and the scope of the present invention as hereinafter defined by the appended claims and that the present invention is thus not limited to the examples provided.

What is claimed is:

1. A telecommunications system comprising at least one primary radio station and a plurality of secondary radio stations, wherein at least one secondary radio station is matched to a primary radio station, each station has a transmitter and a receiver, characterised in that the primary station is arranged for setting up a point to point full duplex communication link to a matched secondary station or vice versa, and that the primary station is arranged for issuing a extension request to the matched secondary station and to further matched secondary stations after the setting up of the point to point communication link, and the secondary station to which the communication link has been set up switches off its transmitter, and the matched secondary station and the further matched secondary stations have their receivers ready for receiving a broadcast message from the primary station.

2. A telecommunications system according to claim 1, wherein the primary station is arranged for issuing a release request to matched secondary stations receiving broadcast messages from the primary station after having received the extension request, the secondary stations releasing the communication link with the primary station after having received the release request.

3. A telecommunications system according to claim 1, wherein the station establishing the point to point communication link is arranged for issuing an establishment request for establishing the communication link with the opposite station while applying a double checking protocol for checking whether both channels in the duplex communication link are free, which double checking protocol comprises the following steps:

a) after having found a free channel, the establishing station switches on its transmitter and transmits at least one activation message to the opposite station,
   b) after having received and decoded an activation message, the opposite station switches on its transmitter on a free channel and checks for a first predetermined period of time whether the establishing station has switched off its transmitter within the first period on the channel on which its transmits the at least one activation message,
   c) the establishing station switches off its transmitter after having found a busy channel of the opposite station,
   d) if is ascertained that after the checking in b) the channel is free, the opposite station transmits at least one acknowledgement message on the channel it has selected after having received the activation message, and
   e) the establishing station switches on its transmitter on the channel it was transmitting the at least one activation message after having received and decoded the acknowledgement message.

4. A channel extension protocol for use in a telecommunications system comprising at least one primary radio station and a plurality of secondary radio stations, in which system a secondary radio station is matched to a primary radio station, whereby the stations have a transmitter and a receiver, characterised in that the primary station sets up a point to point full duplex communication link to a matched secondary station or vice versa, and that the primary station issues a extension request to the matched secondary station and to further matched secondary stations after the setting up of the point to point communication link, that the secondary station to which the communication link has been set up switches off its transmitter, and that the matched secondary station and the further matched secondary stations have their receivers ready for receiving a broadcast message from the primary station.

5. A primary radio station for use in a telecommunications system. the telecommunications system including at least one primary radio station and a plurality of secondary radio stations. wherein each secondary radio station includes a transmitter and receiver, wherein a secondary radio station is matched to a primary radio station, the primary radio station comprising:

a transmitter for transmitting messages; and a receiver for receiving messages wherein, the primary radio station sets up a point to point full duplex communication link to a matched station, and issues an extension request to matched secondary stations after the setting up of the point to point communication link, the secondary station to which the communication link has been set up switches off its transmitter, and that matched secondary stations have their receivers ready for receiving a broadcast message from the primary station.

6. A telecommunications system comprising at least one primary radio station and a plurality of secondary radio stations, in which system at least one secondary radio station is matched to a primary radio station, whereby the stations have a transmitter and a receiver, characterised in that the primary station is arranged for setting up a point to point full duplex communication link to a matched secondary station or vice versa, that the secondary station to which the full duplex communication has been set up is arranged for transmitting a transfer message to the primary station for transferring the link to another matched secondary station, that the primary station transmits a release request to the secondary station to which the link has been set up, and that the primary station issues a link establishment request for establishing a full duplex communication link with the other matched secondary station.

7. A telecommunications system comprising at least one primary radio station and a plurality of secondary radio stations, in which system at least one secondary radio station is matched to a primary radio station, whereby the stations have a transmitter and a receiver, characterised in that the primary station is arranged for setting up a point to point full duplex communication link to a matched secondary station or vice versa, that the secondary station to which the full duplex communication has been set up is arranged for transmitting a channel skip message to the primary station for skipping the link to another channel, that the primary station transmits a release request to the secondary station to which the link has been set up in response to which the secondary station enters a channel scanning mode, that the primary station issues a link establishment skip request for establishing another full duplex communication link with the secondary station, and that the primary station transmits a skip off message to the secondary station after having set up the other communication link.

* * * * *